Sept. 12, 1933.　　G. R. LEGGETT ET AL　　1,926,205
AUTOMATIC ROD FEEDING APPARATUS
Filed Jan. 17, 1929　　7 Sheets-Sheet 1
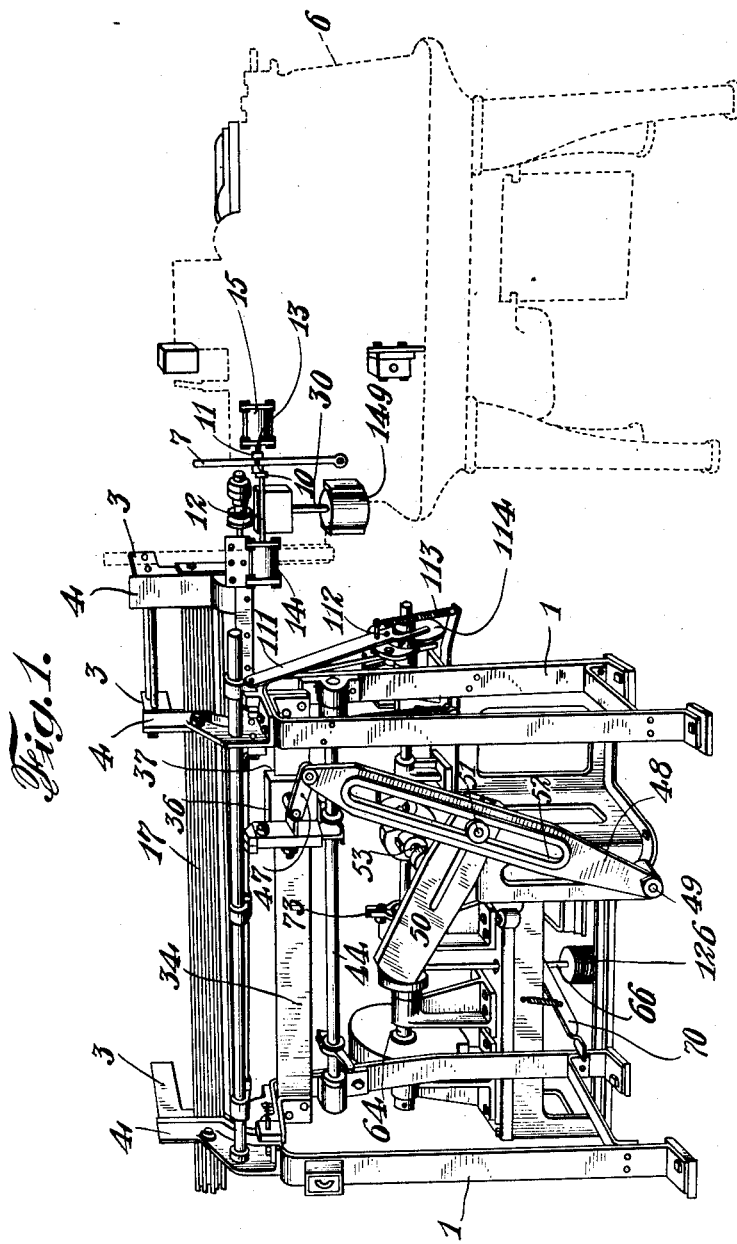

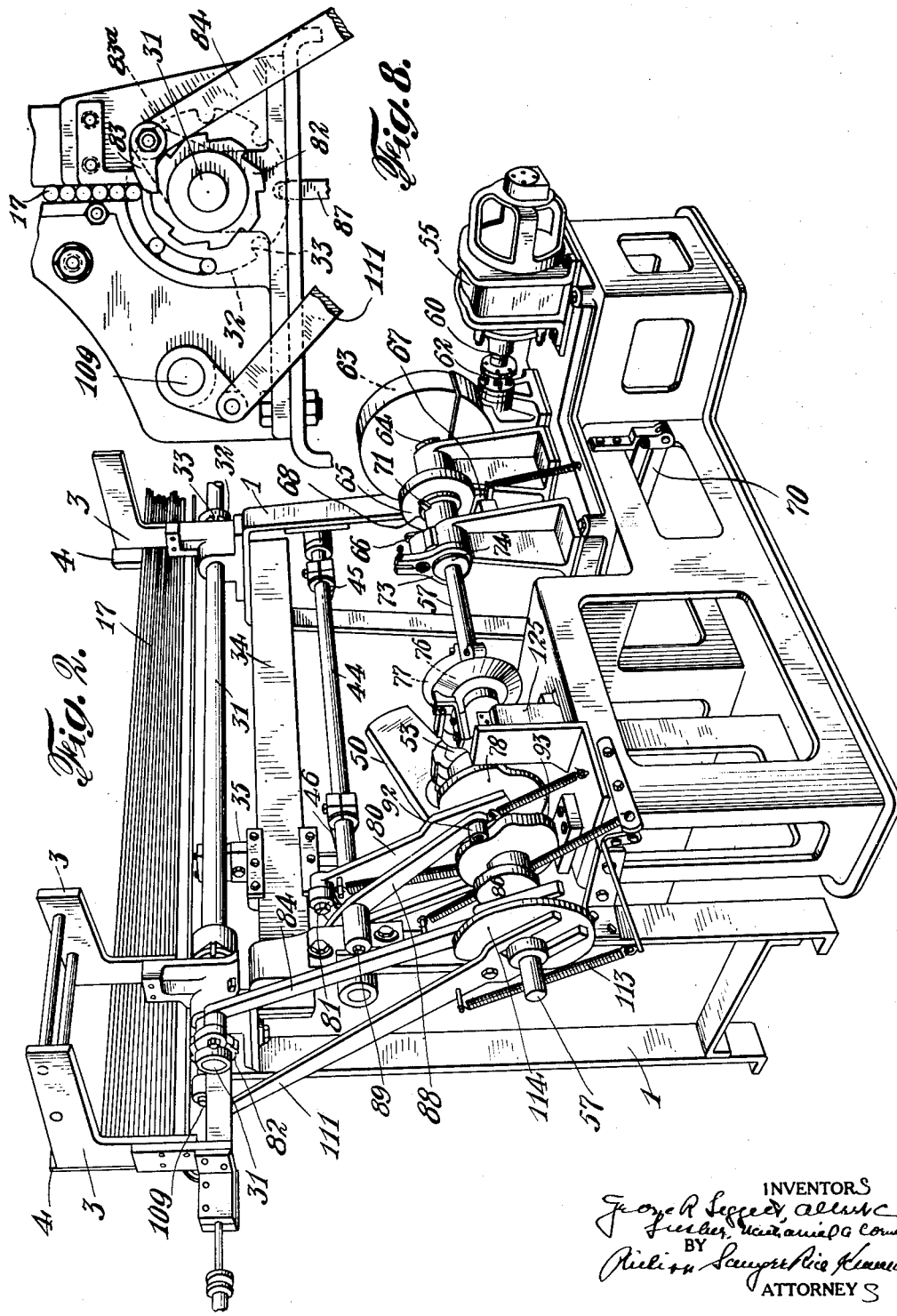

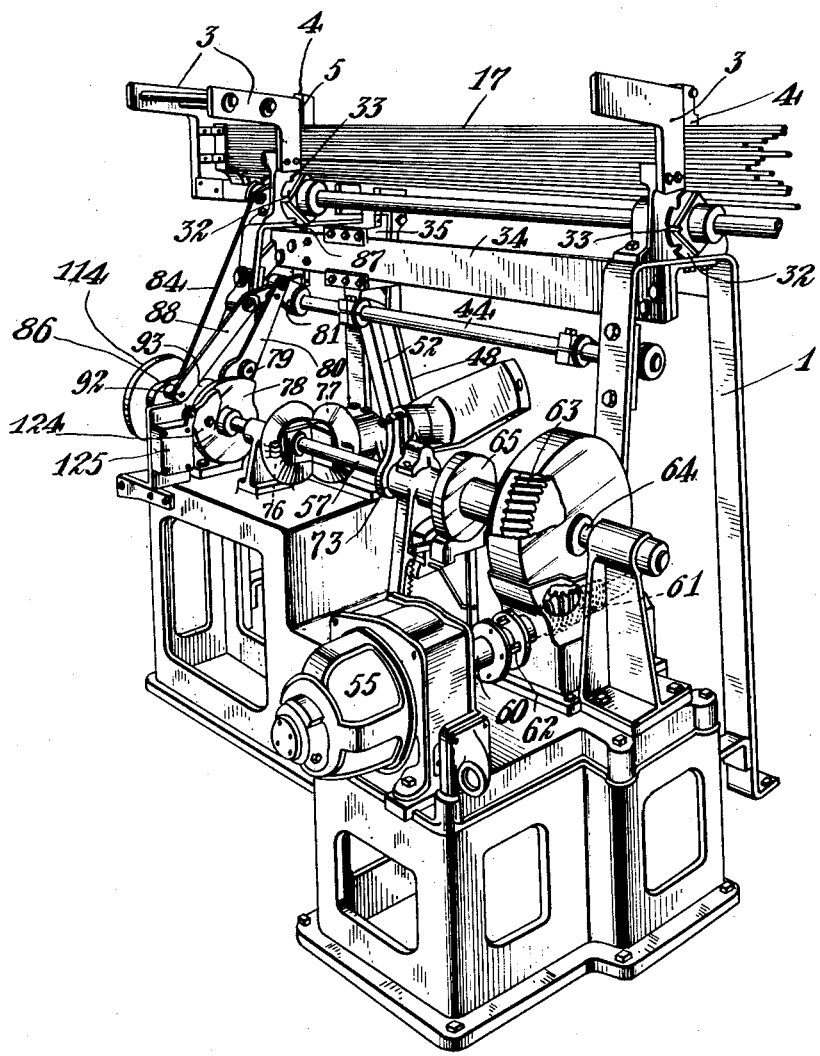

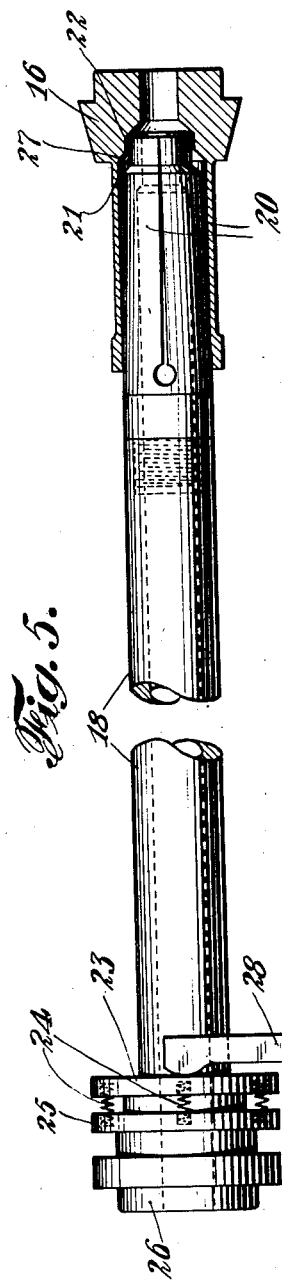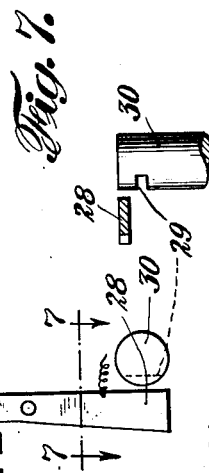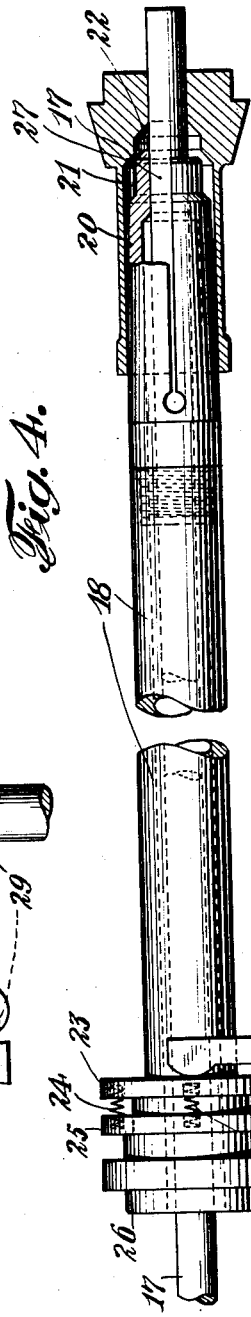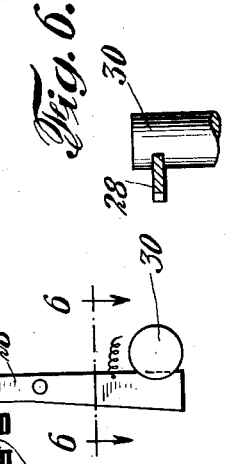

Sept. 12, 1933. G. R. LEGGETT ET AL 1,926,205
AUTOMATIC ROD FEEDING APPARATUS
Filed Jan. 17, 1929 7 Sheets-Sheet 5

INVENTORS
BY
ATTORNEYS

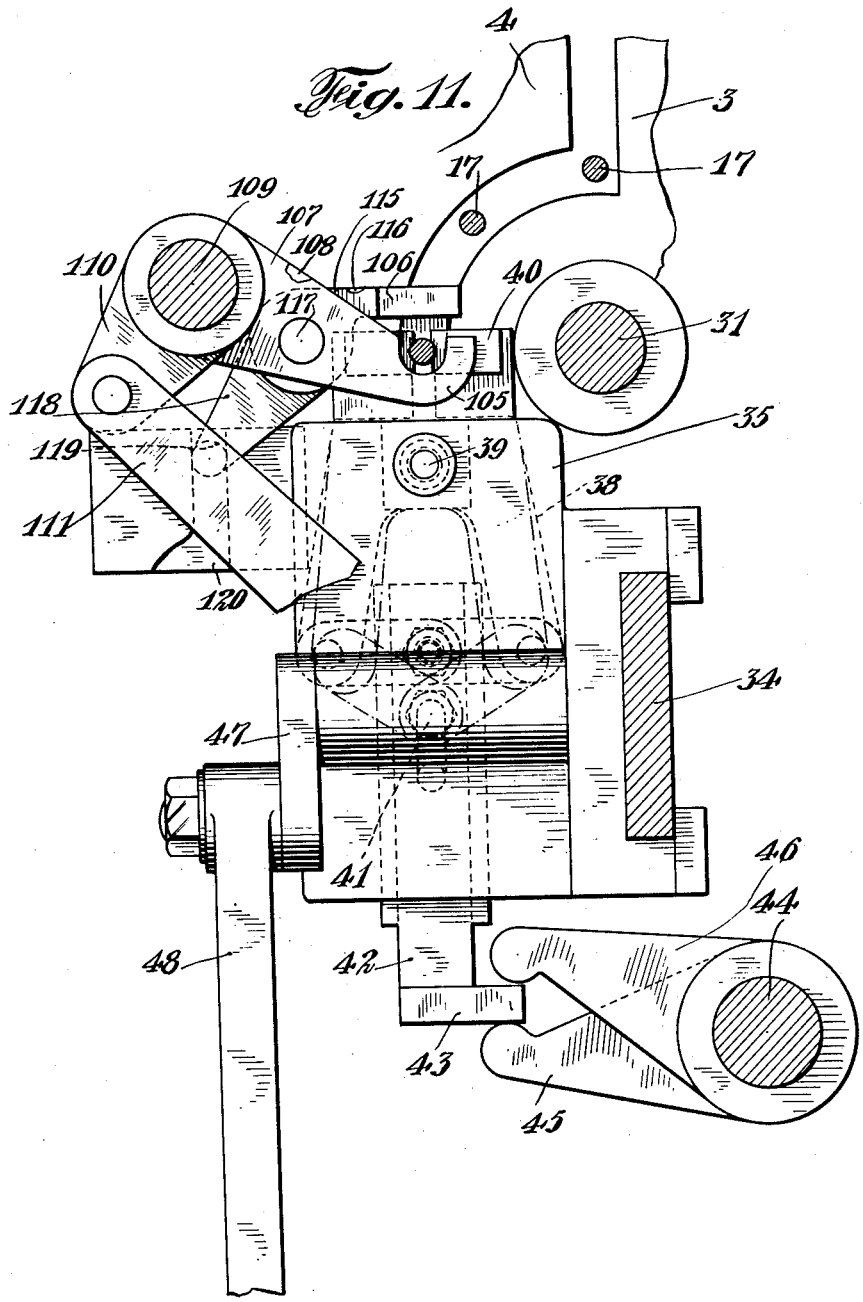

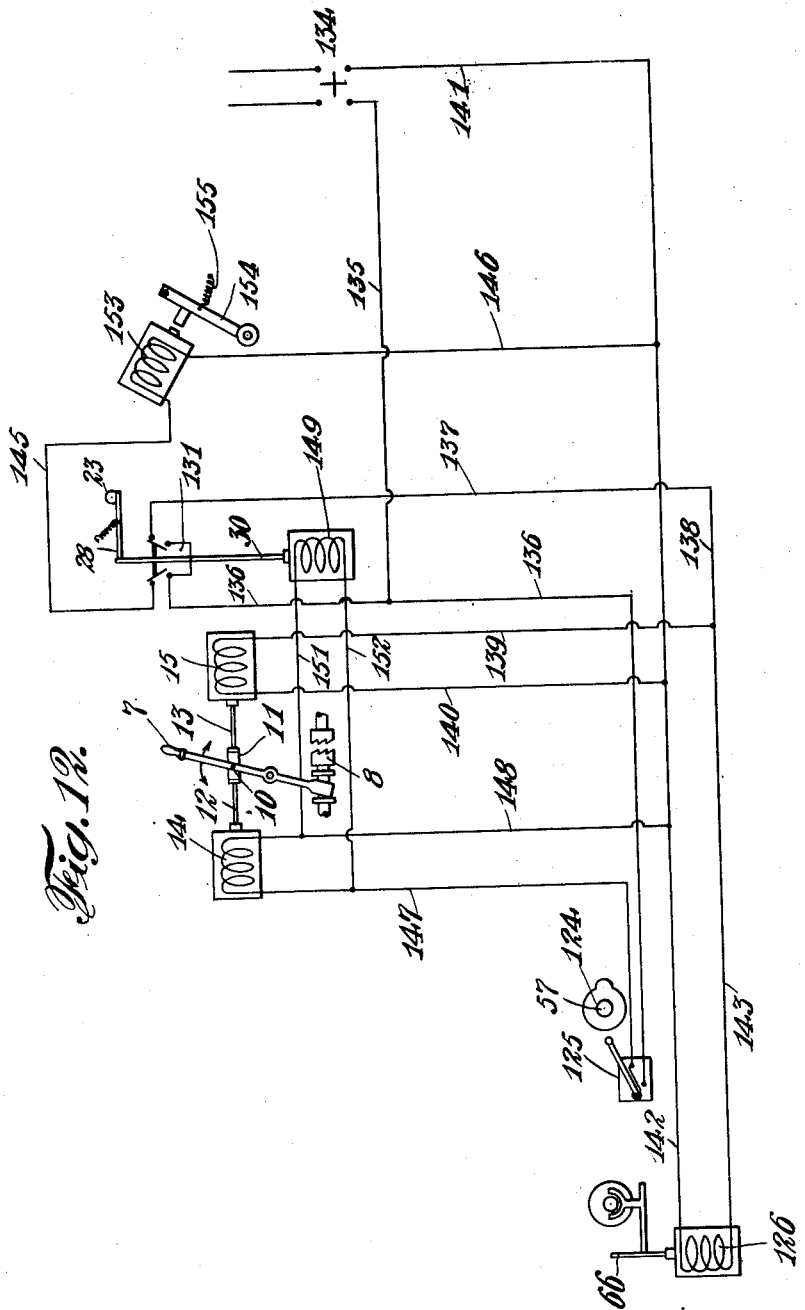

Patented Sept. 12, 1933

1,926,205

UNITED STATES PATENT OFFICE

1,926,205

AUTOMATIC ROD FEEDING APPARATUS

George R. Leggett and Albert C. Lusher, Waterbury, and Nathaniel A. Cornell, Cheshire, Conn., assignors to Scovill Manufacturing Company, Waterbury, Conn., a corporation of Connecticut Application January 17, 1929. Serial No. 333,225

11 Claims. (Cl. 29—62)

This invention relates to automatic rod feeding apparatus and more particularly to automatic rod feeds for so-called automatic screw machines.

Such machines commonly include feeding mechanism which feeds the rod stock forward step-by-step for successive cycles of machine operations. According to common practice, the rods are supplied to the screw machine by an attendant. If one attendant is provided for each machine, he is necessarily idle while the machine is operating on a rod. If he has charge of a number of machines, he is often absent when a given machine requires a new rod. This machine, therefore, runs idly, with a consequent loss in production.

It is an object of the present invention to provide apparatus for automatically supplying rod stock, at the proper time, to an automatic screw machine, whereby such losses in time and production are avoided.

With this and other objects in view, the invention consists in the features, combinations, details of construction and arrangements of parts which will be first described in connection with the accompanying drawings and then more particularly pointed out.

In the drawings:

Figure 1 is a perspective view, with parts in outline, of apparatus constructed in accordance with the invention;

Figure 2 is a perspective view of part of the same taken from the opposite side;

Figure 3 is a perspective view of the parts shown in Fig. 2, taken from a different point;

Figure 4 is an enlarged detail, showing the screw machine feed in plan with parts in section;

Figure 5 is a similar view showing a different position of the parts;

Figure 9:
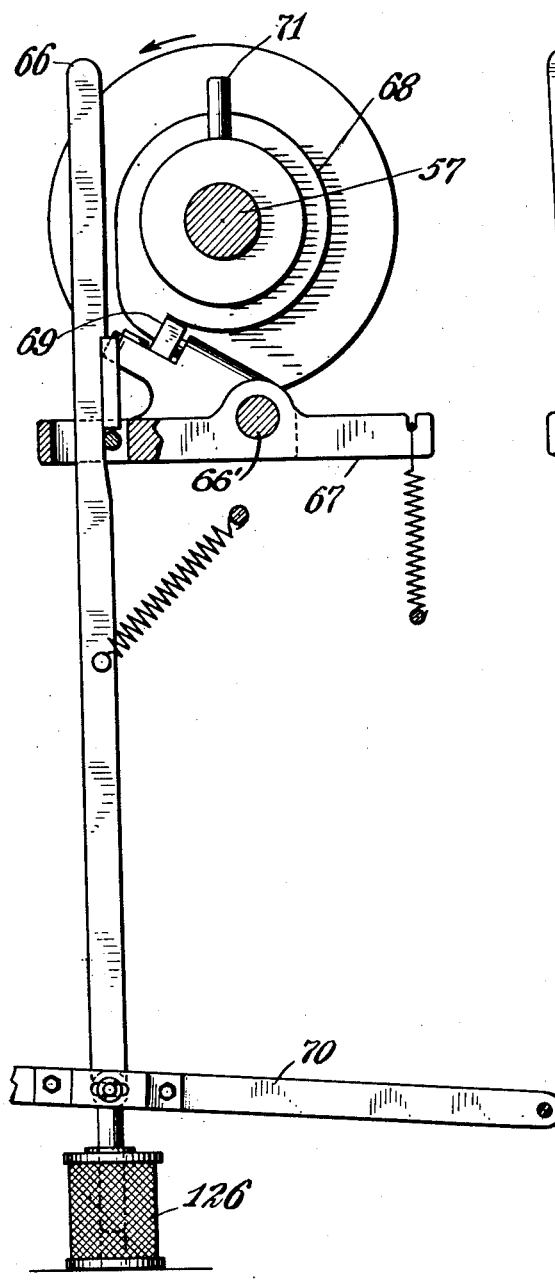
Figure 10:
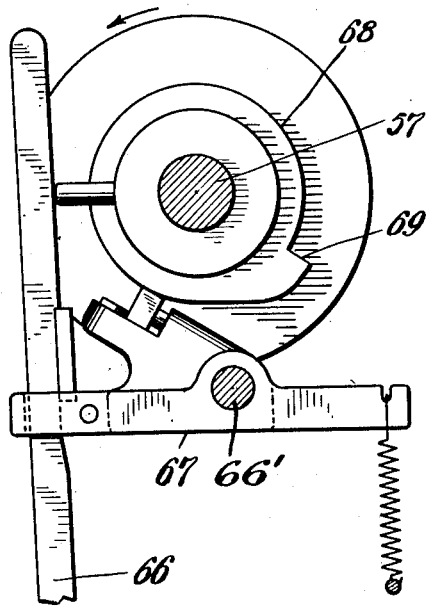

Figures 6 and 7 are sectional views taken on the lines 6—6, 7—7 of Figs. 4 and 5 respectively;

Figure 8 is an enlarged detail showing, in elevation, part of the rod supplying means;

Figure 9 is an enlarged detail showing in elevation, part of the clutch control of the rod supplying means;

Figure 10 is a similar view showing a different position of the parts;

Figure 11 is an enlarged detail showing, in vertical section, part of the rod supplying means; and Figure 12 is a wiring diagram.

Referring to the drawings, Fig. 1 shows, largely in outline, one standard form of an automatic screw machine 6. Rod stock, e. g. a brass rod, is supplied to this machine and is given a step-by-step feed therethrough, one or more machining operations being performed at each step. Since automatic screw machines are well known no detailed description thereof is here necessary, except as to the parts hereinafter referred to.

The screw machine, here illustrated as an example, has a chuck 16 for holding the rod stock 17 during the several operations of the machine. Associated with this chuck is a reciprocating feeding tube 18, for advance end of which is split to form a plurality of spring-like gripping fingers 20. As the tube advances, its gripping fingers grasp the rod stock and feed it forward through the chuck. As the tube is withdrawn, the fingers slide idly along the rod to obtain a new grip for the next advance.

The feeding tube is fed forward by a lever (not shown) acting against a collar 26 on the rear end of the tube. The tube is withdrawn by means of springs 24 located between a collar 25 fixed on the tube and a collar 23 loose on the tube.

To control the normal feeding stroke of the tube 18, in the present embodiment the chuck 16 has a chamber 21 at the end of which is a shoulder 27 (Fig. 4). As the split end of the tube, expanded by the stock, advances in chamber 21, the end of the tube strikes shoulder 27 which thus functions as a limiting stop.

There is provided means for automatically causing the automatic screw machine to stop upon predetermined conditions, e. g. the final feeding step of the work piece or rod, and this may conveniently be accomplished by electrically controlled means. Although capable of various constructions, in that here shown as an example, on the framework of the machine is a pivoted lever 7 connected to a clutch mechanism, indicated diagrammatically at 8 in Fig. 12. This clutch may be of any suitable construction for controlling the main drive of the screw machine. When lever 7 is to the right, as viewed in Figs. 1 and 2, the clutch is disengaged and the screw machine stops. When lever 7 is to the left, the clutch is engaged and the machine runs.

Pivotally secured to clutch lever 7 is a link 11 (Fig. 1) secured to the core 13 of a solenoid 15. When the coil of this solenoid is energized to attract its core 13, clutch lever 7 is moved to the right to stop the screw machine.

In the present exemplification, the circuit for solenoid 15 is controlled by a switch (later referred to) operated by a plunger 30 (Figs. 4 and 5). This plunger, during normal operation of the screw machine, is held raised (open circuit position) by a spring-held lever 28, one end of which takes into a notch 29 in the upper end of plunger 30. The other end of lever 28 is located adjacent collar 23 on the feeding tube. During normal step feeds of the tube, collar 23 does not advance sufficiently to actuate lever 28 so that plunger 30 remains up. The parts are so arranged, however, that plunger 30 will be released following the final feeding stroke of tube 18 for a given work piece. To this end, as here shown, shoulder 27 (Figs. 4 and 5) surrounds a recess 22 formed in chuck 16. When the gripping fingers are extended by a gripped work piece they cannot enter recess 22 and so engage shoulder 27, as previously described. Eventually, as the work piece feeds forward, the fingers, on the back idle stroke of the feeding tube, slip off the trailing end of the work piece and collapse. On the next advance stroke of the tube, the collapsed fingers pass by shoulder 27 and enter recess 22 (Fig. 5). This gives the tube stroke a slight overthrow. This overthrow is sufficient to cause collar 23 to actuate lever 28 to withdraw its free end from notch 29 in plunger 30. Plunger 30, being thus released, drops to close the switch controlling the circuit for solenoid 15, causing clutch lever 7 to be thrown to stop position, whereupon the screw machine stops.

There is provided means for automatically supplying a rod or work piece to the screw machine and this supplying means may be automatically put into operation by the stopping of the screw machine. While the rod supplying means may vary, it may conveniently include a magazine and means for indexing individual rods into a position to be taken by feed tube 18.

In the embodiment here illustrated as an example, adjacent the screw machine is a rod supplying device comprising a framework 1. On this framework is a magazine formed by a plurality of uprights 3 opposed by a plurality of uprights 4. These two sets of uprights are spaced apart sufficiently to receive rods in single row, one above the other. The bottom rod in the magazine is supported by an indexing device later referred to. On the uprights 3 are slanting supports for receiving the rods and down which they may roll or slide into the magazine space 5 between the sets of uprights. It will be seen that this magazine may be adapted to carry any desired quantity of stock.

At the bottom of the magazine space 5 is an indexing device for taking a rod from the magazine and alining it with the feeding device of the screw machine, e. g. the tube 18. As here shown as an example, mounted on a shaft 31 are a plurality of disks 32 each provided with a number of equally spaced notches 33. The notches of the several disks are alined so that a rod may be maintained straight during the indexing movement.

As appears more clearly in Fig. 8, the lowermost rod in the magazine is received in the uppermost notches of the indexing disks. In this position, this rod is out of line with the tube 18. To index the rod into alined position, as here shown, on shaft 31 is a ratchet 82. Cooperating with this ratchet is a pawl 83 pivotally mounted on a pawl carrier 83ᵃ. Also pivoted to the pawl carrier is a link 84 carrying a cam roller 85 which rides on the surface of a cam 86. This cam is mounted on a main cam shaft 57 hereinafter referred to and is arranged to cause operation of link 84 once for each revolution of the shaft. Thus, upon each revolution of shaft 57 the indexing device is stepped ahead one step. Each step of the indexing means removes one rod from the magazine and positions a preceding rod in alinement with the screw machine feed.

To lock the indexing device between operations, a finger 87 (Fig. 3) adapted to enter a notch 33, is carried on the end of a bell crank 88 pivoted to the frame at 89. The other end of the bell crank carries a roller 92 running on a cam 93 on cam shaft 57. This cam is so laid out that the finger 87 is held in locking position except when the indexing device is to be operated.

The rod supplying means includes means for transferring the alined rod into the screw machine. Although capable of various constructions, in that here shown as an example, carried by framework 1 is a track member 34 on which reciprocates a carriage 35. Pivoted, as at 39 (Fig. 11) on this carriage are a pair of levers 38 carrying complementary adjustable jaw members 40. When the lower ends of levers 38 are separated the jaws are closed to grasp a rod and when the levers are reversed the jaws are opened to release the rod.

While the jaws may be opened and closed in various ways, in the present embodiment the lower ends of levers 38 are connected by a toggle joint 41. Pivotally connected to the two elements of the toggle at their junction is a toggle actuating bar 42. When the bar is raised the toggle is closed to close the jaws and when the bar is lowered the toggle is broken to open the jaws.

While the actuating bar 42 may be operated in various ways, as here shown as an example, on the lower free end of bar 42 is a foot 43. Associated with this foot are two oppositely faced levers 45, 46. The parts are so arranged that when the carriage is drawn back and about to start its feeding stroke, lever 45 is in a position to engage foot 43 from below and raise bar 42 to close the jaws. When the carriage is at the end of its feeding stroke, lever 46 is in a position to engage foot 43 from above and depress bar 42 to open the jaws.

Levers 45, 46 are mounted on a rock shaft 44. On this rock shaft is a rocker arm or lever 81 pivoted to a lever 80. Lever 80 carries a roller 79 running on a cam 78 on shaft 57. Cam 78 is so formed that levers 80, 81 rock shaft 44 alternately in opposite directions. That is, in one cycle, represented by one revolution of cam 78 and shaft 57, shaft 44 is rocked clockwise (as viewed in Fig. 11) to swing lever 45 up and close the jaws, and later is rocked reversely to swing lever 46 down and open the jaws.

While the carriage 35 may be reciprocated in various ways it may conveniently have a relatively slow feeding stroke and a relatively fast return stroke. In the embodiment here illustrated as an example, connected to the carriage 35 by a link 47 is a slotted bar 48, the lower end of which is pivoted as at 49. Riding in the slot 52 of bar 48 is a crank pin 51 adjustably mounted on a crank plate 50. This crank is mounted on a shaft 53. On shaft 53 is a bevel gear 77 meshing with a similar gear 76 on the main shaft 57 so that one revolution of shaft 57 causes one revolution of shaft 53. Through the connection described, rotation of shaft 53 causes bar 48 to swing back and forth on its pivot and this causes reciprocation of carriage 35 on its track. When the crank pin is in the upper part of slot 52 the bar is moved slowly, giving the carriage a slow advance. When the pin is working in the lower end of the slot it moves the bar more rapidly, giving the carriage a quick return. It will be seen that the carriage makes one advance and return for one revolution of shaft 53.

With the carriage drawn back, the jaws 40 are closed to grasp a rod positioned by the indexing mechanism. The carriage then advances, transferring the rod into the screw machine until its leading end is forced into the bite of chuck 16. This insertion of a new rod also serves to eject the stump of the preceding end left in the chuck.

As above stated, the supply of a new rod is automatically effected upon completion of the feed of the preceding rod through the screw machine. This, as later described, may be effected by causing the automatic starting of shaft 57 upon the stopping of the screw machine. Provision is also made for automatically stopping the rod supply means after supplying a new rod. This may be accomplished by causing shaft 57 to stop automatically after one revolution, representing one cycle of the rod supply means.

To this end, in the exemplification illustrated, coupled to the shaft 60 of a motor 55, by a pin coupling 62, is a worm shaft 61. The worm of this shaft meshes with a worm gear 63 on a short shaft 64. The adjacent ends of shaft 64 and shaft 57 are connected by a clutch, indicated at 65, of the one revolution type. Such clutches are well known and no detailed description is here necessary, although certain parts of the clutch mechanism are here illustrated.

Referring to Figs. 9 and 10, on shaft 57 is a cam 68 having a shoulder 69 arranged to be engaged by a dog 67 pivoted on a rod 66'. In clutches of this type, the connection tends to rotate the driven shaft. That is, the connection tends to rotate shaft 57, but such rotation is prevented as long as dog 67 engages shoulder 69. When control rod 66 is depressed, by means to be described, dog 67 is swung out of engagement with shoulder 69, thus permitting shaft 57 to rotate. During such rotation, dog 67 rides on the periphery of cam 68 until, at the end of one revolution, it again drops into engagement with shoulder 69, stopping the shaft.

During rotation of shaft 57 rod 66 is held displaced against its spring by a finger 71 which engages the rod (Fig. 10).

To regulate shaft 57 and prevent any overthrow, there is provided a pair of adjustable brake shoes 73 acting on a drum 74 keyed to the shaft.

While the means for automatically starting the cycle of the rod supply means may vary, as here shown, control rod 66 is formed as an extension of the core of a solenoid 126. When the screw machine is stopped, the coil of this solenoid is energized, as later described, to depress rod 66 and start shaft 57. The control rod also has a foot pedal 70 for non-automatic operation should the same be desired.

There is provided means for guiding the rod stock during a portion of the feed to prevent whipping of the trailing end of the rod. To this end, as here shown, extending beneath the path of the feeding rod is a hook-shaped guide member 105 (Fig. 11). Above the latter is a complementary guide member in the form of a cover 106 wide enough to rest on the top edges of guide 105. Member 105 is on the ends of a pair of levers 107, 108 secured to a rock shaft 109. Also secured to this shaft is a rocker arm 110 pivoted to a link 111 having a roller 112 held by a spring 113 to a cam 114 on cam shaft 57. Cam 114, at the proper time, as later described, causes guide member 105 to swing downwardly out of the path of carriage 35, and later return it to guiding position. A corresponding movement is given cover 106. To this end, the cover is mounted on a pair of levers 115, 116 secured to a rock shaft 117 journalled in levers 107, 108. Secured to this rock shaft 117 is a rocker arm 118 having an offset roller 119 riding in a vertical slot 120. When shaft 117 is displaced by the downward swing of levers 107, 108, the roller-slot device causes shaft 117 to rock, thus swinging cover 106 upwardly out of the way of the carriage. Reversely, when the guide member 105 is returned to guiding position, cover 106 is also returned to guiding position.

Cam 114 is so designed that the guide members are displaced as carriage 35 makes its back idle stroke and during part of its advance stroke. As soon as the carriage has passed the guide elements on its advance, cam 114 causes them to close into guiding position. In this position they embrace the rod along a length sufficient to prevent any substantial whipping of the trailing end of the rod. They remain in this position during the latter part of the advance stroke of the carriage and while the rod is being stepped through the screw machine.

There is provided means for effecting the automatic starting of the screw machine after a new rod or work piece has been supplied thereto. As here shown as an example, mounted on the main shaft 57 is a cam 124 on which rides the roller of the operating arm of an electric switch 125. Such cam-operated switches are well known and no further description is necessary. Cam 124 is so designed that switch 125 is momentarily closed at the completion of a revolution of shaft 57. This, as is later more fully described, energizes a circuit which includes the coil of a solenoid 14 (Fig. 1). The core 12 of this solenoid is connected by a link 10 with clutch lever 7. When solenoid 14 is thus energized, lever 7 is reversed, i. e. moved to clutch engaging position, to start the screw machine.

In describing the operation of the apparatus it is assumed that the magazine has been supplied with rod stock; that a new rod has been supplied to the screw machine; and that snap switch 134 (Fig. 12) is closed to connect the wiring with the power line. The attendant starts the first cycle by throwing clutch lever 7 to starting position. This starts the screw machine which runs until the rod stock present has been step-fed through the same. After the last regular step, the fingers of feed tube 18 collapse and the next forward stroke has sufficient overthrow to cause lever 28 to be actuated to release plunger 30. The latter drops and closes switch 131 (Fig. 12). This closes a circuit comprising conductors 135, 136, right hand contacts of closed switch 131, conductors 137, 138, 139, coil of solenoid 15, and conductors 140, 141. Solenoid 15 being thus energized swings clutch lever 7 to stop position and the screw machine stops.

This closing of switch 131 also causes the start of the rod supply cycle. The coil of solenoid 126 is included in a circuit paralleling the circuit just described by means of conductors 142, 143. Solenoid 126 being thus energized depresses control rod 66 to withdraw dog 67 and permit shaft 57 to rotate.

A shaft 57 rotates, carriage 35 starts its back idle stroke and cam 114 causes guide members 105, 106 to be swung out of the way. Cam 93 causes locking finger 87 to be withdrawn from its notch in disk 32 to release the indexing device. Thereupon cam 86 causes link 84 to step the indexing device ahead one step, thus presenting a new rod in alinement with tube 18 and removing the next rod from the magazine. Locking finger 87 then enters the next notch, again locking shaft 31. By this time carriage 35 has reached the end of its back stroke. Cam 78 now actuates lever 45 to cause jaws 40 to close on the rod just positioned and the carriage advances to transfer the rod into the screw machine. During this advance stroke, cam 114 causes guide members 105, 106 to close on the feeding rod. At the end of the advance stroke of the carriage, cam 28 actuates lever 46 to open jaws 40.

The rod supply cycle just described is effected during a single revolution of shaft 57. As this revolution is completed, dog 67 again engages shoulder 69 and shaft 57 stops, thus automatically stopping all parts of the rod supply means.

At the end of this revolution of shaft 57, cam 124 causes momentary closing of switch 125. This closes a circuit including conductors 135, 136, closed switch 125, conductor 147, coil of solenoid 14 and conductors 148, 141. Solenoid 14 being thus energized reverses clutch lever 7 to starting position and the screw machine starts again, to operate on the new rod.

At the same time, switch 131 is opened and plunger 30 returned to previous position. To this end plunger 30 is formed as an extension on the core of a solenoid 149. The coil of this solenoid is in parallel with the circuit just described by means of conductors 151, 152. Solenoid 149 being thus energized, plunger 30 is raised to open switch 131. The plunger is held raised by lever 28 again taking into notch 29 by virtue of its spring.

In the usual construction of screw machines there is provided a swinging stop which, in normal position, is engaged by the forward end of the rod at each feeding step, whereby the position of the rod in the chuck is controlled. In order that the insertion of a new rod may eject the stump of the preceding rod, provision is made for automatically displacing the swinging stop. Such a stop is indicated at 154 in Fig. 12. This stop, at the end of a screw machine cycle is swung out of the way by an electro-magnet 153. The coil of this magnet is in a circuit including conductors 135, 136, left contacts of switch 131, conductor 145, coil of magnet 153, and conductors 146, 141. When switch 131 is closed, therefore, upon stopping of the screw machine, magnet 153 is energized to displace stop 154. When switch 131 is opened, stop 154 is replaced by a return spring 155.

With the apparatus described, the entire operation of supplying and operating on successive rods is automatic. The screw machine is idle except when supplied with stock and no attendant is necessary except to initially start the operation and to keep the magazine supplied with stock. Moreover, with the construction described it is not necessary to have the rod stock of uniform length.

What we claim is:

1. In combination with the feeding means of an automatic screw machine, a magazine for a supply of rod stock, means for delivering a rod from the magazine to said feeding means, and automatic means controlled by a predetermined operation of said feeding means for stopping said feeding means and starting said delivery means.

2. In combination with the feeding means of an automatic screw machine, a magazine for a supply of rod stock, means for delivering a rod from the magazine to said feeding means, and automatic means controlled by a predetermined operation of said feeding means or stopping said feeding means, starting and later stopping said delivery means and restarting said feeding means.

3. In combination with the feeding means of an automatic screw machine, means for delivering a rod into a position to be taken by said feeding means, and automatic means for stopping said feeding means and starting said delivering means called into action by the final step feed of the previous rod.

4. In combination with an automatic screw machine, a rod feeder, and electrically controlled means for stopping said screw machine and starting said rod feeder called into action by the completion of an operation by said screw machine.

5. In combination with an automatic screw machine, electrically controlled operating means therefor, a rod feeder, electrically controlled operating means for the rod feeder, and means under the control of the screw machine for causing said second means to start the rod feeder and to cause said first means to stop the screw machine.

6. In combination with an automatic screw machine, electrically controlled operating means therefor, a rod feeder, electrically controlled operating means for the rod feeder, and means under the control of the rod feeder for causing said first means to start said screw machine.

7. In combination with an automatic screw machine, electrically controlled operating means therefor, a rod feeder, electrically controlled operating means for the rod feeder, means under the control of the screw machine for causing said second means to start the rod feeder and to cause said first means to stop the screw machine, and means under the control of the rod feeder for thereafter causing said first means to start said screw machine.

8. In combination with the step-by-step feed of an automatic screw machine, means to limit the length of rod fed on each step feed, means to feed a new rod upon the completion of operation on the old rod, and control means operative upon the introduction of the new rod to remove said limiting means to permit the ejection of the old rod stump upon the first step feed of the new rod.

9. In combination with the feeding means of an automatic screw machine, a magazine for a supply of rod stock capacitated to contain rods of different lengths, means for delivering a rod into a position to be taken by said feeding means, and automatic means for stopping said feeding means and starting said delivering means called into action by the final step feed of the previous rod.

10. In combination with the feeding means of an automatic screw machine, a rod magazine, aligning means cooperating therewith, rod gripping delivery mechanism for conveying rods therefrom to said feeding means, and electrically controlled actuating apparatus for said delivery mechanism called into action by said feeding means.

11. In combination with the feeding means of an automatic screw machine, a rod magazine, delivery mechanism for conveying rods therefrom to said feeding means and electrically controlled actuating apparatus for said delivery mechanism called into action by passage of the trailing end of a rod being fed by said feeding means past a predetermined point.

GEORGE R. LEGGETT.
ALBERT C. LUSHER.
NATHANIEL A. CORNELL.